United States Patent Office 3,354,124
Patented Nov. 21, 1967

3,354,124
POLYESTERS FROM 3,6-BIS(CARBOXY-METHYL) DURENE
Eckhard Christian August Schwarz, Grifton, N.C., assignor to E. I. du Pont de Nemours and Company, Wilmington Del., a corporation of Delaware
No Drawing. Filed June 30, 1964, Ser. No. 379,359
7 Claims. (Cl. 260—75)

This invention relates to a novel class of polyesters, and to fibers, films, and other shaped articles produced therefrom.

In accordance with the invention it has been found that certain hindered alk-aryl dicarboxylic acids can be used to prepare polyesters of unique physical properties. In contrast to polyesters which have heretofore been obtained from certain other alk-aryl dicarboxylic acids, e.g., p-phenylene diacetic acid, those of the present invention are remarkably stable to commercial melt polymerization techniques.

As will be evident from the disclosure hereinafter, the polyesters of the invention also possess other unique properties which make them, as a class, well suited to the formation of fibers, films, and other shaped articles.

In one embodiment of the invention there is formed a novel linear polyester of one or more organic diols and one or more polycarboxylic acids, at least one mol percent of the total polycarboxylic acid components being 3,6-bis(carboxymethyl)durene. Such a polyester will thus be homopolymeric or copolymeric and will comprise recurring units of the formula

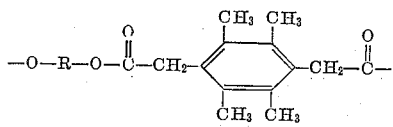

wherein R is a divalent organic radical, e.g., the radical remaining after removal of the hydroxyl groups from an organic diol. In fiber form such a linear polyester will have an intrinsic viscosity of at least 0.3, as measured in solution at 25° C. in one part by volume of trifluoroacetic acid and three parts by volume of methylene chloride.

Homopolyesters of the above units, e.g., as consisting essentially of the above units wherein R is the same throughout the polymer molecule, are generally crystalline, high melting, and are stable to conditions used in commercial melt polymerization and spinning techniques. Accordingly, they are well suited to the formation of fibers, films and other useful shaped articles. Copolyesters are similarly useful and, as will be described in greater detail in subsequent paragraphs, offer special advantages when formed of particular repeating units. Regardless of whether homopolyesters or copolyesters are formed, however, it is noteworthy that polyesters of 3,6-bis(carboxymethyl)durene are greatly superior to those of p-phenylene diacetic acid. Whereas the α-methylene groups of the latter suffer easily oxidative degradation or crosslinking at elevated temperatures, those of the former are sterically protected by the bulky methyl groups.

In a preferred embodiment of the invention, novel copolyesters are formed from ethylene glycol with a mixture of 90 to 99 mol percent terephthalic acid and 10 to 1 mol percent 3,6-bis(carboxymethyl)durene. Such a copolyester will thus have recurring units consisting essentially of those represented by the formulas

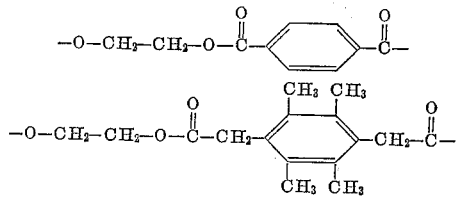

wherein the ratio of the units is within the range of 90/10 to 99/1, respectively. Fibers of such a linear copolyester will have an intrinsic viscosity of at least 0.3, as measured in solution at 25° C. in one part by volume of trifluoroacetic acid and three parts by volume of methylene chloride.

It has been frequently suggested in the prior art to improve one or more physical properties of the well-known polyethylene terephthalate polymer to gain superior performance in certain fiber applications. In many cases an improved level of dyeability, for example, has been achieved by the substitution of a portion of the repeating ethylene terephthalate units by other units. For the most part, however, the attainment of superior performance with respect to one property such as dyeability has been accompanied by losses in other important fiber properties, notably modulus and recovery. Frequently, too, the introduction of the copolymerizing unit will result in an excessive depression in melting point.

The above copolyesters of the invention are particularly unique in that compared to homopolymeric polyethylene terephthalate they give an improved dye rate with disperse dyes and yet, at least after a normal finishing operation, exhibit suitable properties with respect to modulus and recovery.

In general fibers of these copolyesters will have modulus values considerably above those of a polyethylene terephthalate fiber after both have been subjected to a similar finishing treatment. These same copolyester fibers will have only a nominal increase in boil off shrinkage and yet for the most part will retain tenacity and elongation properties comparable to those of polyethylene terephthalate. These copolyesters will also have polymer melt temperatures only slightly below those of homopolymeric polyethylene terephthalate, the extent of the difference depending upon the percentage of the respective dicarboxylic acid constituents. Substantially higher molecular weights and accordingly higher polymer melt temperatures may be obtained, however, by employing solid phase polymerization procedures.

The novel homopolyesters and copolyesters are well suited to a variety of applications. Those of sufficiently high intrinsic viscosity can be melt spun into filaments or cast from solutions to form self-supporting films. The substantially improved modulus properties of the copolyester filaments make them particularly advantageous for use in safety belts, V-belt reinforcement, fire hose, cordage, sewing thread, sail-cloth, etc.

A convenient method for preparing the polyesters of the invention involves reaction of one or more diols with the dimethyl ester of 3,6-bis(carboxymethyl)durene and, optionally the dimethyl ester of another dicarboxylic acid in the desired proportion in an ester interchange reaction followed by polycondensation at high temperature and at low partial pressure of the diols, until a polymer of the desired molecular weight is produced. In carrying out the ester interchange reaction in the preparation of the preferred copolyesters, at least one molecular proportion of ethylene glycol per molecular proportion of the mixed esters should be used, preferably about 1.5 to 2.1 mols of glycol per mol of the esters. It is advantageous to employ catalysts to accelerate the rate of reaction, and it has been found that manganous acetate, calcium acetate, and sodium methoxide are suitable ester interchange catalysts while antimony trioxide, litharge, and the tetraalkyl titanates such as tetraisopropyl titanates are suitable polycondensation catalysts.

Instead of reacting the diol or diols with dimethyl esters of the acids, other esters of the acids may be used, especially other lower alkyl esters, phenyl esters, or the like. The polyesters may also be prepared by reacting the acid or acids directly with the diol or diols, or with esters of the diols with acetic acid or other lower aliphatic acids. Other equivalent methods may also be employed.

The 3,6-bis(carboxylmethyl)durene, either alone or along with one or more other dicarboxylic acids, may be reacted with a wide variety of diols of the formula $R(OH)_2$ to form the novel polyesters of the invention. Thus R may be aliphatic, aromatic, or cycloaliphatic and may be either hydrocarbon, as is preferred, or may contain ether, thioether, or other linkages. Typically suitable diols are ethylene glycol, butylene glycol, hexamethylene glycol, decamethylene glycol, polyethylene and polypropylene ether glycols of M.W. 200 to 10,000, trans-1,4-bis(hydroxymethyl)cyclohexane, 3,6 - bis($\beta$-hydroxyethyl)durene, trans/trans-1,1'-bicyclohexane-4,4'-dimethanol, bisphenol A, and the like. In conjunction with the 3,6-bis(carboxymethyl)durene, one or more other dicarboxylic acids may suitably be used to form copolyesters. Among various dicarboxylic acids which may be used are adipic acid, sebacic acid, hexahydroterephthalic acid, terephthalic acid, 2,6- or 2,7-naphthalic acid, diphenoxyethane-4,4'-dicarboxylate, bis-carboxyphenyl ketone, and p,p'-sulphonyldibenzoic acid. In place of the dicarboxylic acids their corresponding ester-forming derivatives may be used, i.e., derivatives which readily undergo polyesterification with a diol or derivative thereof. For example, a lower alkyl ester of the dicarboxylic acid may be used, such as the dimethyl ester. Alternatively, acid chlorides of the dicarboxylic acids may be used.

The expression "polymer melt temperature" employed with respect to the products of this invention is the minimum temperature at which a sample of the polymer leaves a wet molten trail as it is stroked with moderate pressure across a smooth surface of a heated metal. "Polymer melt temperature" has sometimes in the past been referred to as "polymer stick temperature."

The term "intrinsic viscosity," as used herein, is defined as the limit of the fraction $\ln(r)/c$, as $c$ approaches 0, where $(r)$ is the relative viscosity, and $c$ is the concentration in grams per 100 ml. of solution. The relative viscosity $(r)$ is the ratio of the viscosity of a solution of the polymer in a mixture of 1 part trifluoroacetic acid and 3 parts methylene chloride (by volume) to the viscosity of the trifluoroacetic acid/methylene chloride mixture, per se, measured in the same units at 25° C. Intrinsic viscosity is a measure of the degree of polymerization.

In the examples, values of tenacity in g.p.d., elongation in percent, and initial modulus in g.p.d. (all expressed as "T/E/Mi") are determined upon polyester fibers which have been spun and drawn as indicated. Measurements are made before and after a finishing procedure which comprises the consecutive steps of:

(a) heat treating the filaments by boiling them in water for 15 minutes while allowing 3% shrinkage in length, (b) heating the filaments in an oven at 180° C. for 3 minutes, again allowing 3% shrinkage in length, (c) heat treating the filaments by boiling them in water for 15 minutes while allowing 1% shrinkage in length, and finally (d) air drying the filaments.

The disperse dye test referred to in the examples is indicative of the rate at which the fibers will accept a dye. According to the test the fibers are dyed employing an aqueous bath containing 20% (based on the weight of the fiber) of a yellow disperse dye comprising 3'-hydroxyquinophthalone at 100° C. for 90 minutes, using a 1000 to 1 ratio of bath to fiber. Fiber samples removed from the dye bath at intervals of 9, 16 and 25 minutes are rinsed, dried, and then analyzed quantitatively for percentage dye adsorbed by extracting the dye with hot chlorobenzene and determining the amount of dye spectrophotometrically. A plot of the amount of dye adsorbed per gram of fiber vs. the square root of time shows the dye rate (slope of the line connecting the points) which is then compared with the dye rate of polyethylene terephthalate.

In the following examples a number of the polymerizations were performed using as a catalyst a solution of sodium hydrogen hexabutyltitanate, $NaHTi(OBu)_6$. This was prepared by dissolving 1 g. of sodium in 200 ml. of n-butyl alcohol, then adding to this solution 15.0 g. of tetra-n-butyl titanate.

This invention is further illustrated, but is not intended to be limited, by the following examples in which parts and percentages are by weight, unless otherwise specified.

*Example I*

Preparation of 3,6-bis(carbomethyoxymethyl)durene of the formula

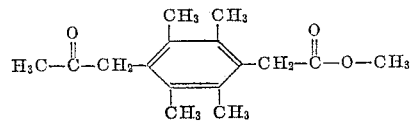

3,6-bis(cyanomethyl)durene can be obtained by chloromethylation of durene followed by reaction of the product with an alkali metal cyanide in the known manner. Fifty grams of 3,6-bis(cyanomethyl)durene was suspended in 250 ml. of ethylene glycol and rapidly stirred in a 2-neck flask. Eighty grams of potassium hydroxide in 40 ml. of water were added and the mixture was refluxed with a rapid stream of nitrogen being bubbled through the solution until no more ammonia vapors were evolved. The clear solution which resulted was then poured into 1500 ml. of water. The aqueous solution was filtered and acidified with hydrochloric acid to precipitate 3,6-bis(carboxymethyl)durene. The precipitate was washed first with water, then with acetone, and finally dried.

60.8 g. of 3,6-bis(carboxymethyl)durene was refluxed for 14 hours in 600 ml. of methanol containing 3 ml. of conc. $H_2SO_4$ and 20 grams of anhydrous calcium sulfate. The mixture was filtered hot, neutralized with barium carbonate, filtered hot again and the filtrate allowed to cool in an ice bath. The crystals formed were separated. Upon recrystallization from methanol, a product was obtained having a melting point of 123° C. Infrared spectroscopy indicated complete esterification to the dimethyl ester. Elemental analysis was as follows—$C_{16}H_{22}O_4$— Calc.: C=68.9%; H=7.96%; O=22.9%. Found: C=68.7%; H=7.7%; O=22.7%.

*Example II*

Homopolyester of 3,6-bis(carboxymethyl)durene and trans-1,4-bis(hydroxymethyl)cyclohexane. The polymer has the formula

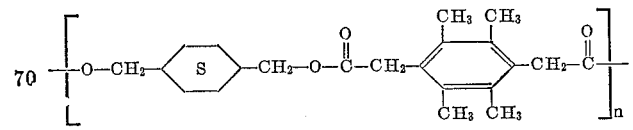

wherein $n$ is an integer indicative of the number of repeating units and preferably is sufficiently large to give an intrinsic viscosity of at least 0.3.

Into a standard polymer tube were placed 8.0 g. of 3,6-bis(carbomethoxymethyl)durene, 4.5 g. of trans-1,4-bis(hydroxymethyl)cyclohexane, and NaHTi(OBu)$_6$ solution (0.25 ml.). The tube was heated in a bath at 270° C. for 20 minutes at atmospheric pressure with the evolution of methanol. Vacuum was then gradually applied and held at 0.2 to 0.3 mm. Hg, 270° C., for 3½ hours. Upon cooling, a crystalline polymer was formed having a polymer melt temperature of 240° C. and an intrinsic viscosity of 0.56. The polymer was converted into fibers by melt spinning.

*Example III*

Homopolyester of 3,6-bis(carboxymethyl)durene and 3,6-bis(β-hydroxyethyl)durene. The polymer has the formula

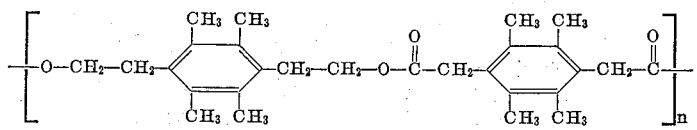

wherein $n$ is an integer indicative of the number of repeating units and is preferably sufficiently large to give an intrinsic viscosity of at least 0.3.

A polymer tube was charged with:

3,6 - bis(carbomethoxymethyl)durene—5.0 g. (0.0180 mol).
3,6-bis(β-hydroxyethyl)durene—5.0 g. (0.0225 mol).
NaHTi(OBu)$_6$ solution—0.1 ml.

Ester exchange with evolution of methanol was carried out in a bath at 240° C. for 5 minutes at atmospheric pressure. Thereafter the temperature was raised to 280° C. and vacuum applied (0.2 mm.). After 10 minutes the temperature was raised to 345° C. and heating continued for 2 hours under the vacuum. The crystalline polymer so obtained had a polymer melt temperature of 305° C. The intrinsic viscosity was found to be 0.724 although the polymer did not completely dissolve in the solvent. The polymer was melt spun into fibers.

*Example IV*

Homopolyester of 3,6-bis(carboxymethyl)durene and trans/trans 1,1'-bicyclohexane-4,4'-dimethanol. The polymer has the formula

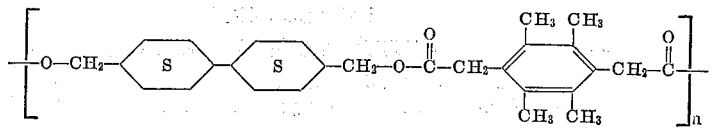

wherein $n$ is an integer indicative of the number of repeating units and preferably is sufficiently large to give an intrinsic viscosity of at least 0.3.

Using 4 g. of 3,6-bis(carbomethoxymethyl)durene (0.0144 mol), 6.0 g. of the diol (0.0155 mol) and NaHTi (OBu)$_6$ (0.20 ml.), the polymerization was conducted as described in Example II except that the initial heating was conducted at 285° C. for 45 minutes and then at the same temperature for 3 hours under vacuum. The resulting polymer had a polymer melt temperature of 160° C. and an intrinsic viscosity of 0.35. Upon crystallization of the polymer (by swelling in methylene chloride) the polymer melt temperature (crystalline melting point) was 195° C. Fibers could be melt spun from the crystalline polymer.

*Example V*

Homopolyester of 3,6-bis(carboxymethyl)durene and ethylene glycol. The polymer has the formula

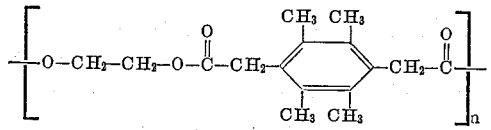

wherein $n$ is an integer indicative of the number of repeating units and is preferably sufficiently large to give an intrinsic viscosity of at least 0.3.

Into a standard polymer tube were placed 10.5 g. of the dimethyl ester of 3,6-bis(carbomethoxymethyl) durene, 4.8 ml. ethylene glycol, 0.0024 g. Sb$_2$O$_3$ and 0.0034 g. manganous acetate. The tube was heated in a bath at 280° C. under reflux for 1 hour at atmospheric pressure with the evolution of methanol. Excess glycol was then distilled out and vacuum (0.3–0.4 mm. Hg) was applied and the temperature maintained at 280° C. for 2½ hours. Upon cooling, a crystalline polymer was formed having a polymer melt temperature of 135° C. Further solid state polymerization with 1.5 ml. ethylene glycol and 0.003 g. Sb$_2$O$_3$ at 280° C. for 3 hours raised the intrinsic viscosity to 0.24.

*Example VI*

Copolyester of ethylene glycol with a mixture of 90 mol percent terephthalic acid and 10 mol percent 3,6-bis-(carboxymethyl)durene. The polymer is composed of recurring units of the formulas

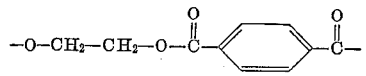

and

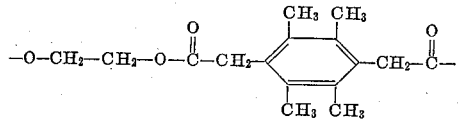

wherein the ratio of the units is 90/10, respectively, the polymer preferably having an intrinsic viscosity of at least 0.3.

A polymer tube was charged with

Dimethylterephthalate—30.0 g. (0.155 mol).
3,6-bis(carbomethoxymethyl)durene—4.78 g. (0.0172 mol).
Ethylene glycol—8.0 ml.
Ethylene glycol, containing 0.002 g./ml. Sb$_2$O$_3$, 7.0 ml.
Ethylene glycol, containing 0.002 g./ml. manganous acetate, 8.0 ml.

The reaction mixture was heated to reflux temperature for 30 minutes. The temperature was then raised to 205° C. for 1 hr. Vacuum was then applied (0.3 mm. Hg) for 3 hours after the temperature had been raised to 280–285° C.

Upon cooling, a crystalline copolymer resulted having a polymer melt temperature of 230–235° C. and an intrinsic viscosity of 0.565. The polymer was converted to fibers by melt spinning. Polymerization in the solid state was then continued at 220° C. for 2 hours, then at 225° for 2 hours longer. This gave an intrinsic viscosity of 0.582.

*Examples VII and VIII*

The procedure of Example VI is repeated*. A second sample is prepared with an increase in the ratio of the terephthalic and 3,6-bis(carboxymethyl)durene acids to obtain a copolyester which is identical except that the mol percentages of the respective units is 98/2. A control sample, similarly prepared, was a homopolymer of ethylene glycol and terephthalic acid.

Fibers were melt spun from each of the three polymers, drawn in length over a heated shoe, and various properties measured thereon. Data obtained from the samples are reported in as follows:

| | | | |
|---|---|---|---|
| Ratio of the two acids, mol percent | 100/0 | 98/2 | 90/10 |
| Polymer melt temperature, °C | 260 | 252 | 230 |
| Intrinsic viscosity, polymer | 0.65 | 0.70 | 0.58 |
| Spinning Temp., °C | 285 | 265 | 245 |
| Draw Ratio | 4.5× | 4.5× | 4.8× |
| Draw (Heated Shoe) Temp., °C | 115 | | 88 |
| Denier (After draw) | 8.6 | 29.2 | 10.8 |
| T/E/Mi: | | | |
| Before finish | 4/19/119 | 1.8/28/71 | 1.2/12/61 |
| Finished | 3.6/27/61 | 3.1/30/80 | 1.6/16/82 |
| Disperse Dye Rate (Relative to homopolymer) | 1 | 2.2 | 5.5 |

As indicated by the above data, the copolyesters yield fibers which after finishing exhibit a substantial improvement in modulus as compared to fibers of polyethylene terephthalate. Even more surprising, however, is the fact that modulus actually improves upon finishing since it has heretofore been generally expected that polyesters will have a decrease in modulus after such a treatment. The increased dye rate is a further significant feature of the above copolyesters.

As many widely different embodiments of this invention may be made without departing from the spirit and scope thereof, it is to be understood that this invention is not to be limited to the specific embodiments thereof except as defined in the appended claims.

What is claimed is:

1. A linear polyester selected from the class consisting of homopolyesters consisting essentially of recurring units of the formula

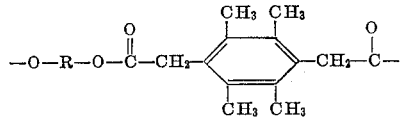

*Solid state polymerization step omitted.

and copolyesters consisting essentially of recurring units of the formulas:

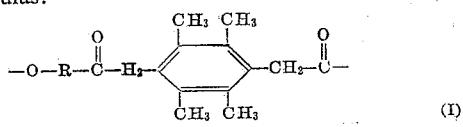

and

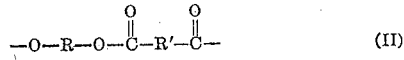

wherein R is the radical remaining after removal of the hydroxyl groups from a diol selected from the group consisting of ethylene glycol, butylene glycol, hexamethylene glycol, decamethylene glycol, polyethylene ether glycol, polypropylene ether glycol, trans-1,4-bis(hydroxymethyl)-cyclohexane, 3,6-bis($\beta$-hydroxyethyl)durene, trans/trans-1,1-bicyclohexane-4,4'-dimethanol, and bisphenol A, and wherein R' is the radical remaining after removal of the carboxyl groups from a dicarboxylic acid selected from the group consisting of adipic acid, sebacic acid, hexahydroterephthalic acid, terephthalic acid, 2,6-naphthalic acid, 2,7-naphthalic acid, diphenoxyethane-4,4'-dicarboxylate, bis-carboxyphenyl ketone, and p,p'-sulphonyldibenzoic acid.

2. A linear homopolyester as defined in claim 1 wherein R is the radical remaining after removal of the hydroxyl groups from trans-1,4-bis(hydroxymethyl)-cyclohexane.

3. A linear homopolyester as defined in claim 1 wherein R is the radical remaining after removal of the hydroxyl groups from 3,6-bis($\beta$-hydroxyethyl)durene.

4. A linear homopolyester as defined in claim 1 wherein R is the radical remaining after removal of the hydroxyl groups from trans/trans-1,1'-bicyclohexane-4,4'-dimethanol.

5. Fibers of the linear polyester as defined in claim 1 and having an intrinsic viscosity of at least 0.3, as measured in solution at 25° C. in one part by volume of trifluoroacetic acid and three parts by volume of methylene chloride.

6. A linear copolyester as defined in claim 1 wherein R is the radical remaining after removal of the hydroxyl groups from ethylene glycol and R' is the radical remaining after removal of the carboxyl groups from terephthalic acid, and wherein the ratio of units of Formula II to units of Formula I is in the range of 90/10 to 99/1, respectively.

7. Fibers of the linear copolyester as defined in claim 6 and having an intrinsic viscosity of at least 0.3, as measured in solution at 25° C. in one part by volume of trifluoroacetic acid and three parts by volume of methylene chloride.

References Cited

UNITED STATES PATENTS 2,856,375 10/1958 Mikeska _____ 260—75
2,967,854 1/1961 Bungs et al. _____ 260—75

WILLIAM H. SHORT, *Primary Examiner.*

SAMUEL H. BLECH, *Examiner.*

R. LYON, *Assistant Examiner.*